United States Patent
Abdulally et al.

(10) Patent No.: US 10,782,016 B2
(45) Date of Patent: Sep. 22, 2020

(54) SYSTEM AND METHOD FOR REDUCING EMISSIONS IN A CHEMICAL LOOPING COMBUSTION SYSTEM

(71) Applicant: General Electric Technology GmbH, Baden (CH)

(72) Inventors: Iqbal Abdulally, Avon, CT (US); Shin Gyoo Kang, Simsbury, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 629 days.

(21) Appl. No.: 15/061,220

(22) Filed: Mar. 4, 2016

(65) Prior Publication Data

US 2016/0265764 A1   Sep. 15, 2016

Related U.S. Application Data

(60) Provisional application No. 62/132,205, filed on Mar. 12, 2015.

(51) Int. Cl.
*F23C 10/10* (2006.01)
*C10J 3/72* (2006.01)
(Continued)

(52) U.S. Cl.
CPC .............. *F23C 10/10* (2013.01); *B01D 53/62* (2013.01); *B01D 53/73* (2013.01); *B01D 53/83* (2013.01); *C10J 3/725* (2013.01); *C10K 1/20* (2013.01); *C10K 1/34* (2013.01); *F23C 10/01* (2013.01); *F23J 15/02* (2013.01); *B01D 2255/2073* (2013.01); *B01D 2257/304* (2013.01); *B01D 2257/502* (2013.01); *B01D 2257/504* (2013.01); *B01D 2257/7025* (2013.01);
(Continued)

(58) Field of Classification Search
CPC . B01D 53/83; F23C 10/01; C10J 3/725; C10J 2300/0993; C10K 1/20
See application file for complete search history.

(56) References Cited

U.S. PATENT DOCUMENTS

| | | | | |
|---|---|---|---|---|
| 5,269,263 | A * | 12/1993 | Garcia-Mallol | F23C 10/10 110/245 |
| 5,509,362 | A | 4/1996 | Lyon | |
| 6,494,153 | B1 | 12/2002 | Lyon | |
| 2004/0237404 | A1 | 12/2004 | Andrus, Jr. et al. | |

(Continued)

FOREIGN PATENT DOCUMENTS

| | | | | |
|---|---|---|---|---|
| EP | 0918192 A1 | 5/1999 | | |
| EP | 2431579 A2 * | 3/2012 | | F01K 23/06 |

(Continued)

OTHER PUBLICATIONS

International Search Report and Written Opinion issued in connection with corresponding PCT Application No. PCT/US2016/021494 dated May 6, 2016.

(Continued)

*Primary Examiner* — David J Laux
(74) *Attorney, Agent, or Firm* — Grogan, Tuccillo & Vanderleeden, LLP

(57) ABSTRACT

A system for removing impurities from post-combustion gas includes an oxidizer and a reducer operatively connected to the oxidizer, the reducer configured to receive the post-combustion gas. The system further includes a CLOU material capable of selective circulation between the oxidizer and reducer. The CLOU material further oxidizes impurities present in the post-combustion gas to reduce or remove the same.

26 Claims, 4 Drawing Sheets

(51) Int. Cl.
    *C10K 1/20*     (2006.01)
    *C10K 1/34*     (2006.01)
    *B01D 53/62*     (2006.01)
    *B01D 53/73*     (2006.01)
    *B01D 53/83*     (2006.01)
    *F23C 10/01*     (2006.01)
    *F23J 15/02*     (2006.01)

(52) U.S. Cl.
    CPC ............... *C10J 2300/0993* (2013.01); *C10J 2300/1603* (2013.01); *C10J 2300/1612* (2013.01); *Y02C 10/04* (2013.01); *Y02C 20/20* (2013.01); *Y02E 20/326* (2013.01); *Y02E 20/346* (2013.01); *Y02P 20/152* (2015.11); *Y02P 20/156* (2015.11)

(56) References Cited

U.S. PATENT DOCUMENTS

| | | | |
|---|---|---|---|
| 2008/0193349 A1 | 8/2008 | Morin et al. | |
| 2009/0020405 A1* | 1/2009 | Fan | B01J 19/00 201/12 |
| 2011/0223083 A1 | 9/2011 | Bialkowski et al. | |
| 2012/0214106 A1* | 8/2012 | Sit | F23C 10/01 431/7 |

FOREIGN PATENT DOCUMENTS

| | | |
|---|---|---|
| FR | 2960943 A1 | 12/2011 |
| WO | 2005124232 A1 | 12/2005 |
| WO | 2010037011 A2 | 4/2010 |
| WO | 2011031755 A1 | 3/2011 |

* cited by examiner

SYSTEM AND METHOD FOR REDUCING EMISSIONS IN A CHEMICAL LOOPING COMBUSTION SYSTEM

CROSS-REFERENCE TO RELATED APPLICATIONS

This application claims the benefit of U.S. Provisional Application Ser. No. 62/132,205, filed on Mar. 12, 2015, which is hereby incorporated by reference in its entirety.

BACKGROUND

Technical Field

The present disclosure relates generally to removing impurities from combustion gas and more specifically to a system for reducing emissions of a chemical looping combustion (CLC) system by oxidizing unburned or partially oxidized gas species of a combustion gas.

Discussion of Art

CLC systems utilize a high temperature process whereby solids such as calcium or metal-based compounds, for example, are "looped" between a first reactor, called an oxidizer, and a second reactor, referred to as a reducer. In the oxidizer, oxygen from injected air is captured by the solids in an oxidation reaction. The captured oxygen is then carried by the oxidized solids to the reducer to be used for combustion or gasification of a fuel such as coal. After a reduction reaction in the reducer, the reacted solids, and, potentially, some unreacted solids, are returned to the oxidizer to be oxidized again, and the cycle repeats.

In the combustion of a fuel, such as coal, a product gas is generated. This gas typically contains pollutants such as carbon dioxide ($CO_2$), sulfur dioxide ($SO_2$) and sulfur trioxide ($SO_3$). The environmental effects of releasing these pollutants to the atmosphere have been widely recognized, and have resulted in the development of processes adapted for removing the pollutants from the gas generated in the combustion of coal and other fuels. Systems and methods for removing $CO_2$ from a gas stream include $CO_2$ capture systems in which a product gas is contacted with a $CO_2$ absorber.

As will be appreciated, it is desirable to sequester or potentially reuse $CO_2$ removed during a $CO_2$ capture process. Indeed, $CO_2$ may be reused as feedstock for other industrial applications, such as the manufacture of plastics, used in enhanced oil recovery processes or potentially converted into a high-value saleable product. For sequestration and reuse, captured $CO_2$ needs to be of a sufficient quality/purity.

Obtaining high purity $CO_2$ can be challenging, however, as oxy-combustion systems, such as chemical looping plants, generate a post-combustion/product gas that contains relatively high amounts of unburned or partially oxidized gas species, such as CO, COS, $H_2$, $CH_4$ and $H_2S$. As a result, this gas is of a poor quality, such that it does not meet the requirements for sequestration or reuse. Moreover, the reduction of emissions of these partially oxidized gas species is desirable to lessen potential harm to downstream equipment, and, more importantly, the environment.

More specifically, referring to FIG. 1, a prior art CLC plant configuration is graphically illustrated. Notably, the plant 10 utilizes a post-reducer air quality control system 40, a flue gas condenser 42, and a gas-processing unit 44 in an attempt to purify the product gas 19 and provide a $CO_2$ stream for sequestration or reuse. Given the aforementioned partially oxidized gas species typically present in the post-combustion gas of this type of plant, however, the condenser and gas-processing unit may be insufficient to capture high purity $CO_2$. Indeed, the additional oxygen needed to remove or reduce the partially oxidized species in the product gas to acceptable levels, i.e., the "oxygen demand," would make the process economically prohibitive and potentially infeasible.

In view of the above, there is a need for a system and method of oxidizing unburned/partially oxidized gas species from post-combustion gas to facilitate $CO_2$ capture. The above described and other features are exemplified by the following figures and detailed description.

SUMMARY OF THE INVENTION

In an embodiment, a system for oxidizing impurities in post-combustion gas is provided. The system includes an oxidizer, a reducer operatively connected to the oxidizer, the reducer configured to receive the post-combustion gas, and a CLOU material capable of selective circulation between the oxidizer and reducer. The CLOU material oxidizes impurities present in the post-combustion gas to remove the impurities.

In another embodiment, a chemical looping system includes a primary chemical looping combustion system that combusts a fuel, which produces a resulting gas containing partially-oxidized impurities and a post-combustion system for oxidizing the partially-oxidized impurities in the resulting gas. The post-combustion system is operatively connected to the primary chemical looping combustion system and includes a reducer and an oxidizer and a CLOU material circulates therebetween. The reducer receives the resulting gas from the primary chemical looping combustion system to further oxidize the partially-oxidized impurities in the same.

In yet another embodiment, a method of oxidizing impurities from a post-combustion gas is provided. The method includes introducing a post-combustion gas to a reducer that is operatively connected to an oxidizer and reacting the post-combustion gas in the reducer with a CLOU material to oxidize the impurities in the post-combustion gas. The method further includes transferring the CLOU material to the oxidizer and introducing air to oxidize the CLOU material and transferring the CLOU material back to the reducer to further react with post-combustion gas.

In an additional embodiment, a method of capturing $CO_2$ in a post-combustion gas from a chemical looping combustion system for sequestration or reuse is provided. The method includes introducing a post-combustion gas produced by the chemical looping combustion system into a reducer of a post-combustion system, the reducer being operatively connected to an oxidizer of the post-combustion system. The method further includes reacting the post-combustion gas in the reducer with a CLOU material to oxidize impurities in the post-combustion gas and transferring the post-combustion gas after it has been oxidized via the CLOU material to a $CO_2$ capture system.

DRAWINGS

The present invention will be better understood from reading the following description of non-limiting embodiments, with reference to the attached drawings, wherein below:

DETAILED DESCRIPTION

Figure 1:
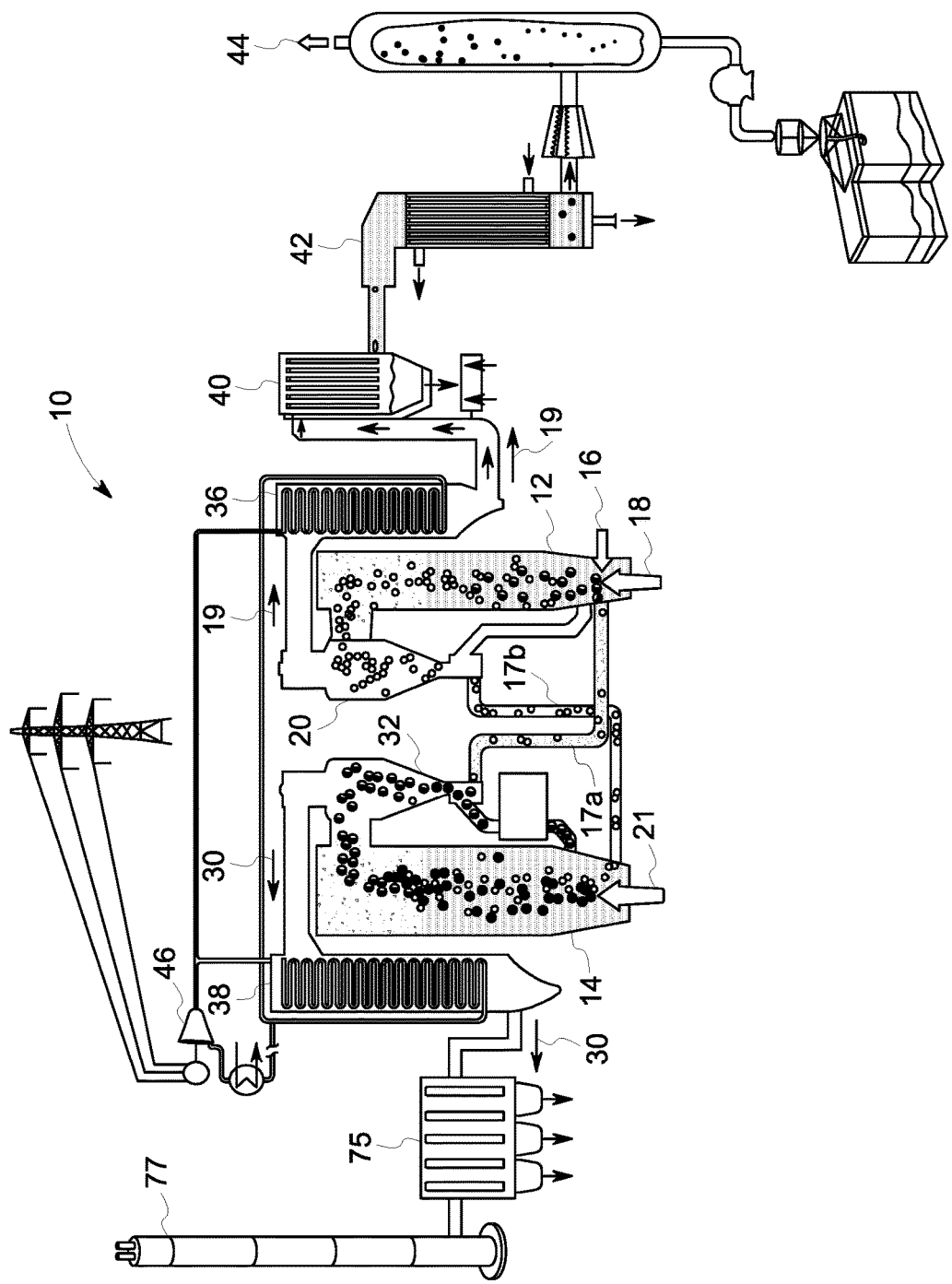
FIG. 1 is a schematic diagram graphically depicting a known chemical looping combustion system.

Reference will be made below in detail to exemplary embodiments of the invention, examples of which are illustrated in the accompanying drawings. Wherever possible, the same reference characters used throughout the drawings refer to the same or like parts. While embodiments of the invention are described herein as being suitable for use in connection with power generation processes that utilize chemical looping, embodiments of the invention may also be applicable for use in other types of power generation systems and processes. In particular, embodiments of the invention may be applicable for use in oxidizing unburned/partially oxidized gas species, i.e., impurities, from post-combustion gas to facilitate CO2 capture.

As used herein, "operatively connected" refers to a connection, which may be direct or indirect. The connection can be, but is not necessarily, a mechanical attachment. As used herein, "communication" means that two or more components are connected in such a manner to allow for the propagation of signals between such components, such as, but not limited to, through wires/cables, fiber optics, and wireless transmitters/receivers. As used herein, "fluidly coupled" or "fluid communication" refers to an arrangement of two or more features such that the features are connected in such a way as to permit the flow of a fluid between the features and permits fluid transfer. As used herein, "post-combustion" refers to a stage or step in the power generation process after a fuel, e.g., coal, has been combusted and includes, but is not limited to CLC combustion processes. "High quality" CO2 refers to CO2 that is of a purity sufficient to allow for sequestration and reuse.

Referring now to FIG. 1, a known chemical looping combustion system 10 is illustrated. As shown, the chemical looping system 10 includes a fuel reactor/reducer 12, formed of a vessel/reactor, and an air reactor/oxidizer 14, also formed of a vessel/reactor. Streams containing a solid oxide 17a and 17b, such as a metal oxide (MeOx) or calcium oxide (CaOx), circulate between the reducer 12 and oxidizer 14. Fuel 16 and steam 18, or product gas, are provided to the reducer 12 which combusts with the oxygen provided by the oxide 17a. The resulting post-reducer gas 19, referred to herein as "post-combustion gas" or "resulting gas," and spent/reduced oxides 17b, exit through the upper portion of the reducer 12 to a first particle separator 20, such as a cyclone.

The spent oxides 17b, and unburned particles exiting the first particle separator 20, are either recycled back to the reducer 12 or provided to the lower portion of the oxidizer 14. The oxidizer 14 receives air or oxygen 21 to oxidize or replenish the reduced oxide 17b. The replenished oxides 17a exit the upper portion of the oxidizer 14 and are separated from the resulting gas 30, e.g., nitrogen and oxygen, by a second particle separator 32, such as a cyclone. The replenished oxides are returned to the oxidizer 14 or provided to the lower portion of the reducer 12. In this fashion, the oxides 17a and 17b circulate between the oxidizer 14 and the reducer 12. Further the resulting gases 19, 30 exiting the reducer 12 and oxidizer 14 respectively, pass through heat exchangers 38, 36 which cool the gases 19, 30 and provide steam to a steam turbine 46 to generate electricity.

As shown, the post-combustion gas 19 that exits the reducer 12 after combustion is provided to an air quality control system 40, such as a desulfurizer and a dust eliminator. The gas 19 is then further passed through a gas condenser 42 and a gas-processing unit 44 to remove any water and purify the post-combustion gas 19 to provide a CO2 stream for sequestration or reuse. The post-combustion gas 19, however, includes unburned or partially oxidized gas species, also referred to herein as "impurities," such as CO, H2, CH4, and H2S. As a result, the condenser and gas-processing unit may be insufficient to capture high quality CO2, even with the aforementioned gas condenser and processing unit.

Figure 2:
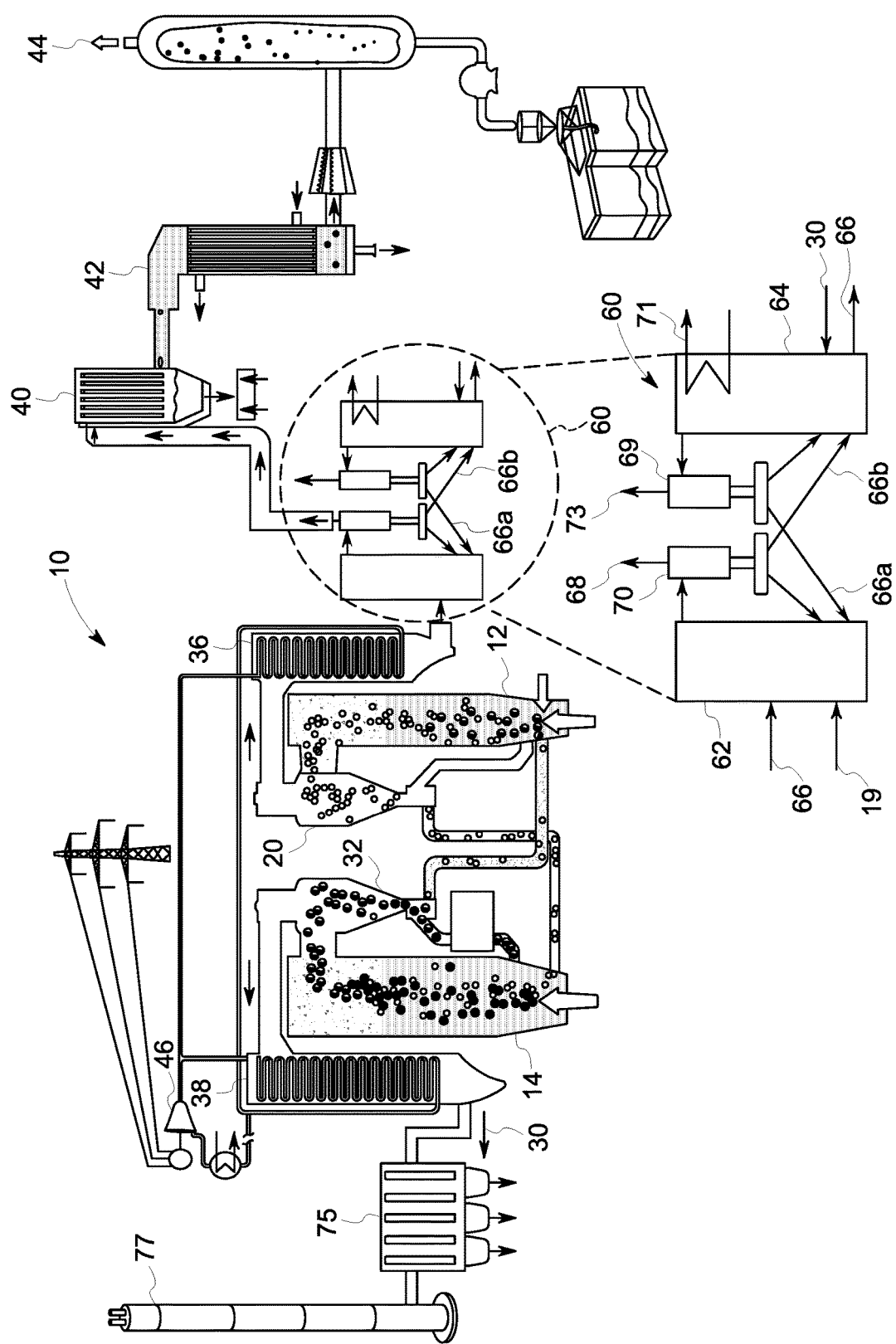
FIG. 2 is a detailed schematic diagram of a chemical looping combustion system including a post chemical looping system in accordance with an embodiment of the present invention.

Turning now to FIG. 2, a schematic diagram of an embodiment of the present invention is depicted. As shown, a system 60 is provided to oxidize unburned or partially oxidized impurities in post-combustion gas. The system 60, also referred to herein as a "post-combustion system," generally includes a fuel reactor, i.e., reducer 62, and an air reactor, i.e., oxidizer 64. As shown, a CO2 product stream, i.e. post-combustion gas 19, that is provided to the reducer 62 for oxidizing the unburned or partially-oxidized gas species/impurities, e.g., CO, H2, H2S, therein. While the illustrated embodiment depicts post-combustion gas exiting chemical looping system 10, it will be appreciated that embodiments may be utilized with other systems that produce a post-combustion gas containing unburned or partially-oxidized gas species/impurities.

In addition to the post-combustion gas 19, a chemical looping with oxygen uncoupling (CLOU) material or mixture of a CLOU material and SOC 66a and 66b are provided to the reducer 62 of the post-combustion system 60 for oxidizing the unburned or partially-oxidized gas species, e.g., CO, H2, H2S, therein. As will be appreciated, the CLOU or CLOU/SOC mixture may include other constituent components, e.g., fuel ash and other solids byproducts.

After oxidization, the now clean post-combustion gas 68 and spent CLOU material 66 are provided to a first particle separator 70, such as a cyclone. As used herein, the term "clean" refers to a CO2 product stream with sufficiently few impurities such that, after downstream processing, CO2 that is suitable for sequestration and reuse may be captured. The separated CLOU material 66b is then provided to the oxidizer 64 of the post chemical looping system 60. In embodiments, the clean post-combustion gas 68 of purified CO2 product stream is provided to a carbon capture system, which, in embodiments, includes an air quality control system 40, gas condenser 42 and gas processing unit 44 for CO2 purification, sequestration and reuse. As will be appreciated, in certain embodiments, other carbon capture systems or techniques may be employed. In this way, the CLOU or CLOU/SOC mixture circulates between the reducer 62 and oxidizer 64.

Figure 3:
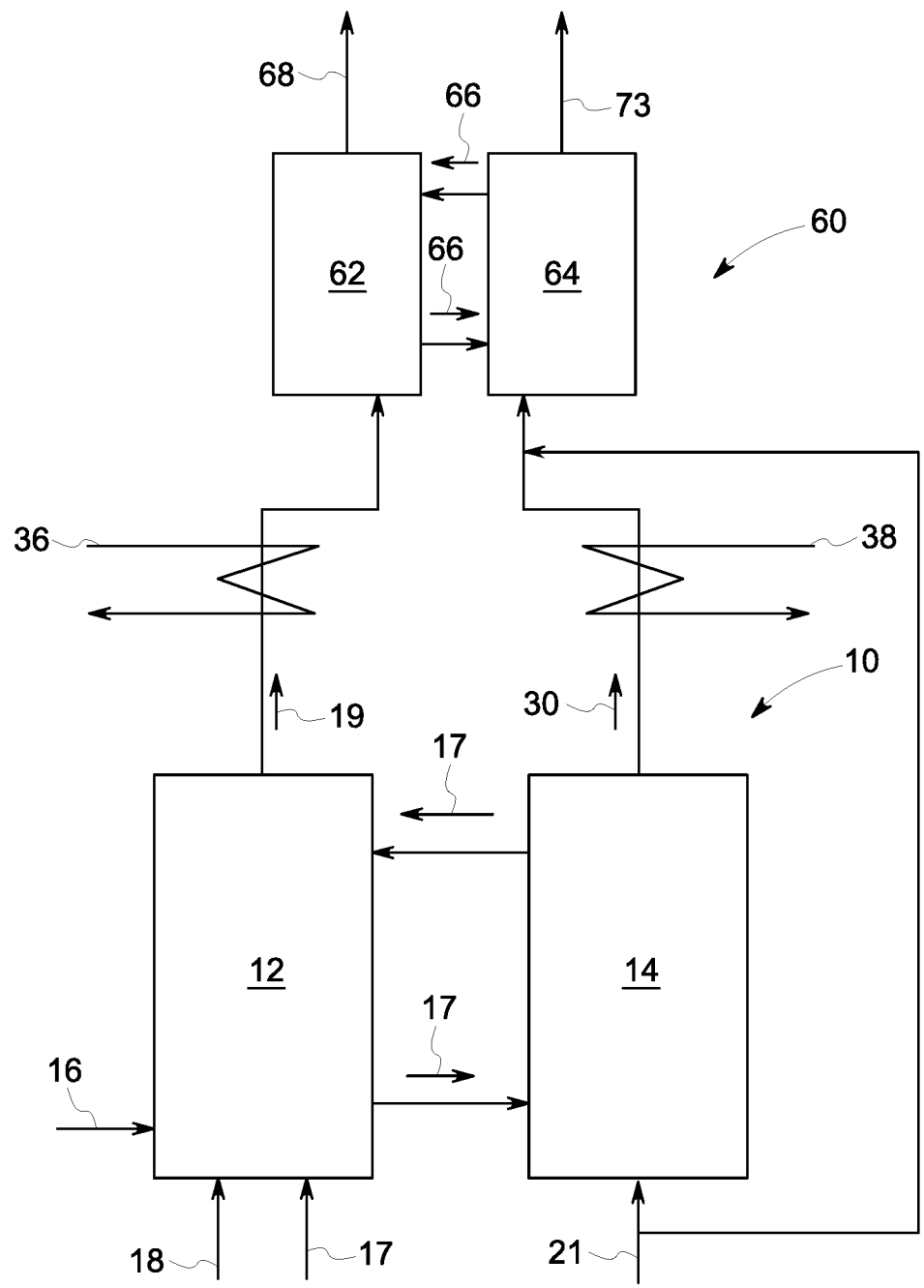
FIG. 3 is a simplified schematic diagram of the post chemical looping system of FIG. 2.

Turning now to FIG. 3, in an embodiment, the oxidizer 64 of the post combustion system 60 receives gas, i.e., nitrogen, oxygen, 30 from the oxidizer 14 of a primary chemical looping combustion system 10. In other embodiments, however, the gas, i.e., air or oxygen stream 30 may be provided from a separate air or oxygen source. While the present invention shows the cooled vitiated air 30 from the oxidizer 14 of a primary chemical looping combustion system 10, in certain embodiments the vitiated air 30 may be substituted with fresh air or other oxygen stream such as the air slip stream 21 for replenishing the CLOU material 66b. In such embodiments, the vitiated air may be provided to the atmosphere through the dust eliminator 75 and stack 77 of the primary chemical looping combustion system 10.

As mentioned above, the oxidizer 64 receives the spent CLOU material from the reducer 62. The spent CLOU material reacts in the oxidizer and is replenished with molecular oxygen from the air stream 30. Once the CLOU material 66b is oxidized, it is provided to a second particle separator 69, such as a cyclone. The oxidized CLOU material 66 is then recycled back to the reducer 62. The resulting gas 73 can then be released to the atmosphere via a dust eliminator and stack.

In certain embodiments, the oxidizer 64 further includes an outlet for removing spent SOC and a heat exchanger 71 to provide heat to the oxidizer 64 from a heat source, such as steam (FIG. 2).

As mentioned, a CLOU material, or a mixture of CLOU materials with a solid oxygen carrier (SOC) 66a, 66b, is employed. The CLOU material functions as an oxygen carrier that releases gaseous oxygen under specific thermal conditions. In particular, CLOU materials 66a, 66b, change their oxidation state between oxide, suboxide and elemental states at different temperatures and have a high degree of reactivity. This phase change is used to either retain or release molecular oxygen into gas phase. The CLOU material 66a, 66b, can include manganese (Mn), Copper (Cu) and Cobalt (Co), which undergo a phase change at a temperature range between 300° F. and 1800° F. In a particular embodiment, the CLOU is a manganese oxide. SOCs for use in mixtures or in combination with CLOU include oxides, such as metal oxides (MeOx) and calcium oxides (CaOx). As a result, embodiments may be particularly suited for use with CLC systems that use the same as solid oxygen carriers.

The release of the $O_2$ by the CLOU and SOC results in the impurities being converted by normal combustion processes that are fast reacting and require low residence times. As a result the size of the system 60 can be reduced relative to, for example, the oxidizer and reducer of the primary chemical looping combustion system 10 as the system 60 treats a smaller volume of gas in a highly reactive condition compared to the gasification reaction that takes place in the primary chemical looping combustor system 10.

As will be appreciated, embodiments of the invention can oxidize varying amounts of impurities in the post-combustion gas by varying the amount of air and the solids circulation between the oxidizer and reducer of the post combustion system 60. Operationally, these two parameters operate in tandem and are complementary. It will be appreciated, that the system 60 may be operatively connected to a controller which can be utilized to vary amounts of air and solids to account for varying impurity quantities. In certain embodiments, real time feedback/measurements of the amount of impurities in the post-reduction gas may be obtained such that the aforementioned parameters may be adjusted in accordance with the same.

Figure 4:
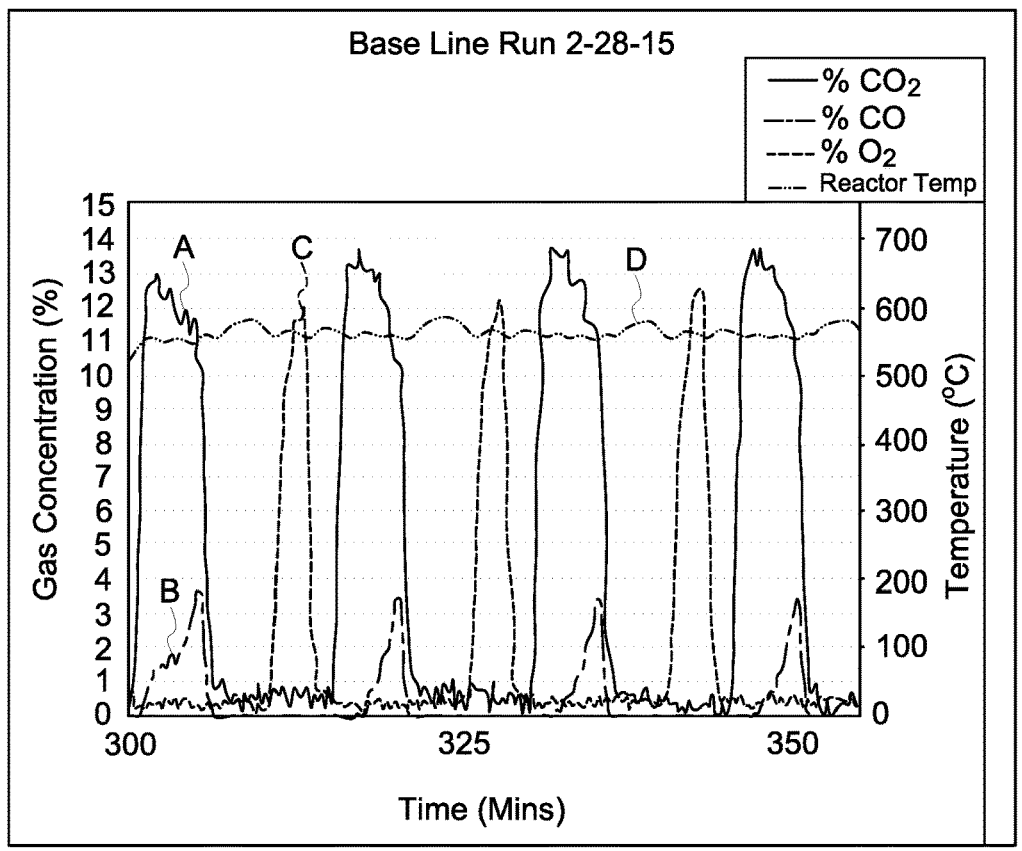
FIG. 4 is a plot the gas composition of a cyclic reduction-oxidation experiment in accordance with an embodiment of the present invention.
Figure 5:
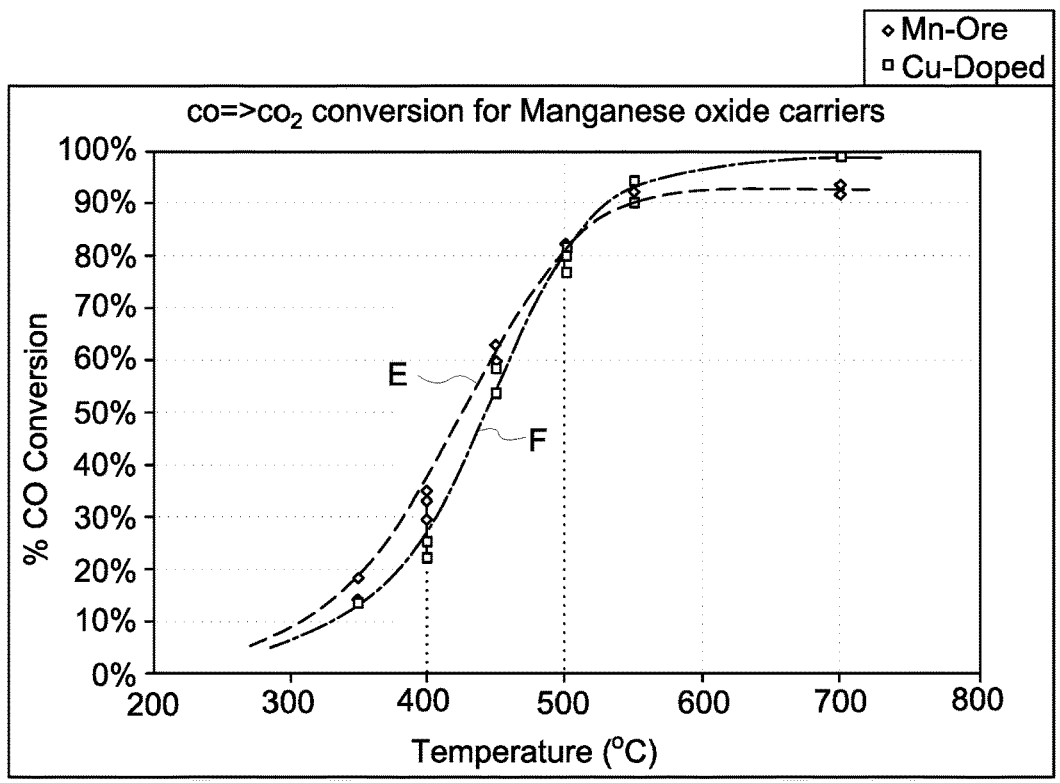
FIG. 5 is a plot of reactivity of the manganese oxide carriers for conversion of CO to $CO_2$ in accordance with embodiments of the present invention.

Referring now to FIGS. 4 and 5, in recent cyclic reduction-oxidation experiments examining the use of manganese as a CLOU, about 30 grams of manganese ore prepared in powder form was placed in a 1-inch diameter bubbling bed reactor. The Mn ore was fluidized by 2 standard liters/min oxygen-containing gas (12.5% $O_2$ in $N_2$) for 5 minutes first and then by CO-containing gas (12.5% CO in $N_2$) for 5 minutes, with 2.5 minutes of $N_2$ purge in between. The Mn ore bed was maintained at a constant temperature D while undergoing four (4) cycles of reduction-oxidation reactions, i.e., total of 60 minutes.

The measured outlet gas composition from experiment at 550° C. is illustrated in FIG. 4. As shown, oxidized Mn powder CLOU material fully converts CO to $CO_2$ for the first 2 min. of the cycle. As can be seen, this redox reaction is reversible allowing cyclic operation. FIG. 5 shows calculated CO conversion rates E at various temperatures. The reaction rate rapidly increases up to 550° C. (1022° F.) then levels off. Based on the experimental results, it is expected that other partially oxidized gas species ($H_2$, $H_2S$, etc.) could similarly be fully oxidized. It is also expected that other materials, such as Co and Cu, would behave similarly.

In an embodiment, system for oxidizing impurities in post-combustion gas includes an oxidizer, a reducer operatively connected to the oxidizer, the reducer configured to receive the post-combustion gas and a CLOU material capable of selective circulation between the oxidizer and reducer. The CLOU material oxidizes impurities present in the post-combustion gas to remove the same. In an embodiment, the reducer receives post-combustion gas from a chemical looping system. The impurities can be C, CO, CH4, or H2S, CLOU material is manganese, copper or cobalt. In certain aspects, the CLOU material is a manganese oxide. The CLOU material may be present along with a solid oxygen carrier. In embodiments, the system of claim 1 wherein the reducer is operatively connected to a carbon capture system which can include a desulfurizer, a gas condenser, and a gas processing unit.

In other embodiments, a chemical looping system includes a primary chemical looping combustion system that combusts a fuel which produces a resulting gas containing unburned/partially-oxidized impurities, a post-combustion system for oxidizing the partially-oxidized impurities in the resulting gas, the post-combustion system operatively connected to the primary chemical looping combustion system, the post-combustion system including a reducer and an oxidizer, wherein a CLOU material circulates therebetween, the reducer receiving the resulting gas from the primary chemical looping combustion system to further oxidize the unburned/partially-oxidized impurities in the same. The unburned/partially-oxidized impurities are C, CO, CH4, or H2S and the CLOU material is manganese, copper or cobalt and, in certain embodiments, the CLOU material is a manganese oxide. The CLOU material may present along with a solid oxygen carrier and a carbon capture system operatively connected to the reducer of the post-combustion system. The carbon capture system includes a desulfurizer, a gas condenser, and a gas processing unit.

In particular embodiments, a method of oxidizing impurities from a post-combustion gas includes introducing a post-combustion gas to a reducer that is operatively connected to an oxidizer, reacting the post-combustion gas in the reducer with a CLOU material to oxidize the impurities in the post-combustion gas, transferring the CLOU material to the oxidizer and introducing air to oxidize the CLOU material, and transferring the CLOU material back to the reducer to further react with post-combustion gas. The post-combustion gas is received from a chemical looping system. The method can further include transferring the post-combustion gas after it has been oxidized via the CLOU material to a carbon capture system. The impurities are C, CO, CH4, or H2S. The CLOU material is manganese, copper or cobalt. In particular embodiments, the CLOU material is a manganese oxide. The CLOU material and a solid oxygen carrier are reacted with the post-combustion gas in the reducer.

In other aspects, a method of capturing CO2 in a post-combustion gas from a chemical looping combustion system for sequestration or reuse, the method includes introducing a post-combustion gas produced by the chemical looping combustion system into a reducer of a post-combustion system, the reducer being operatively connected to an oxidizer of the post-combustion system and reacting the post-combustion gas in the reducer with a CLOU material to oxidize impurities in the post-combustion gas. The method further includes transferring the post-combustion gas after it has been oxidized via the CLOU material to a CO2 capture system. The impurities are C, CO, CH4, or H2S and the CLOU material is manganese, copper or cobalt. The CLOU material can be a manganese oxide. The CLOU material and a solid oxygen carrier are reacted with the post-combustion gas in the reducer.

It is to be understood that the above description is intended to be illustrative, and not restrictive. For example, the above-described embodiments (or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and methods without departing from the spirit and scope of the invention herein involved, it is intended that all of the subject matter of the above description or shown in the accompanying drawings shall be interpreted merely as examples illustrating the inventive concept herein and shall not be construed as limiting the invention

What is claimed is:

1. A system for oxidizing impurities in post-combustion gas comprising:
   an oxidizer;
   a reducer operatively connected to the oxidizer, the reducer configured to receive the post-combustion gas;
   a CLOU material and a solid oxygen carrier (SOC) material, each capable of selective circulation between the oxidizer and reducer;
   wherein the CLOU material releases gaseous oxygen within the reducer to oxidize impurities present in the post-combustion gas to remove the same;
   wherein the oxidizer includes an outlet to remove spent SOC material;
   wherein the system further includes a controller configured to vary an amount of the CLOU material and the solid oxygen carrier (SOC) material circulated between the oxidizer and the reducer in dependence upon a real-time measurement of an amount of the impurities in the post-combustion gas; and
   wherein the oxidizer of the post-combustion system receives a gas containing oxygen from an oxidizer of a primary chemical looping combustion system to replenish the CLOU material.

2. The system of claim 1 wherein the reducer receives post-combustion gas from a chemical looping system.

3. The system of claim 1 wherein the impurities are C, CO, CH4, or H2S.

4. The system of claim 1 wherein the CLOU material is manganese, copper or cobalt.

5. The system of claim 1 wherein the CLOU material is a manganese oxide.

6. The system of claim 1 wherein the reducer is operatively connected to a carbon capture system.

7. The system of claim 6 wherein the carbon capture system comprises:
   a desulfurizer;
   a gas condenser; and
   a gas processing unit.

8. The system of claim 1 further including a heat exchanger disposed in the oxidizer operable to add heat to a reaction therein.

9. A chemical looping system comprising:
   a primary chemical looping combustion system having:
      an oxidizer that oxidizes a solid oxide to produce a replenished oxide that is returned to a reducer of the primary chemical looping combustion system, and a resulting gas containing oxygen; and
      the reducer that combusts a fuel which produces a resulting gas containing unburned/partially-oxidized impurities; and
   a post-combustion system for oxidizing the partially-oxidized impurities in the resulting gas, the post-combustion system operatively connected to the primary chemical looping combustion system, the post-combustion system including a reducer and an oxidizer, wherein a CLOU material and a solid oxygen carrier (SOC) material circulate therebetween, the oxidizer of the post-combustion system receiving the resulting gas containing oxygen from the oxidizer of the primary chemical looping combustion system to replenish the CLOU material, and the reducer of the post-combustion system receiving the resulting gas from the reducer of the primary chemical looping combustion system to further oxidize the unburned/partially-oxidized impurities in the same, wherein:

the CLOU material releases gaseous oxygen within the reducer;

the SOC material does not release gaseous oxygen within the reducer.

10. The system of claim 9 wherein the unburned/partially-oxidized impurities are C, CO, CH4, or H2S.

11. The system of claim 9 wherein the CLOU material is manganese, copper or cobalt.

12. The system of claim 9 wherein the CLOU material is manganese oxide.

13. The system of claim 9 further comprising:
a carbon capture system operatively connected to the reducer of the post-combustion system.

14. The system of claim 13 wherein the carbon capture system comprises:
a desulfurizer;
a gas condenser; and
a gas processing unit.

15. A method for oxidizing impurities from a post-combustion gas comprising:
introducing a gas containing oxygen from an oxidizer of a chemical looping system to an oxidizer of a post-combustion system;
introducing a post-combustion gas to a reducer of the post-combustion system that is operatively connected to the oxidizer of the post-combustion system;
reacting the post-combustion gas in the reducer of the post-combustion system with a CLOU material and a solid oxygen carrier (SOC) material to oxidize the impurities in the post-combustion gas, wherein the CLOU material releases gaseous oxygen within the reducer of the post-combustion system and the SOC material does not release gaseous oxygen within the reducer of the post-combustion system;
transferring the CLOU material and the SOC material to the oxidizer of the post-combustion system and introducing air to oxidize the CLOU material and the SOC material;
transferring the CLOU material and the SOC material back to the reducer of the post-combustion system to further react with post-combustion gas.

16. The method of claim 15 wherein the post-combustion gas is received from a reducer of the chemical looping system.

17. The method of claim 15 further comprising the step of:
transferring the post-combustion gas after it has been oxidized via the CLOU material to a carbon capture system.

18. The method of claim 15 wherein the impurities are C, CO, CH4, or H2S.

19. The system of claim 15 wherein the CLOU material is manganese, copper or cobalt.

20. The system of claim 15 wherein the CLOU material is manganese oxide.

21. The method of claim 15 further including heating a reaction in the oxidizer with a heat exchanger disposed therein.

22. A method of capturing CO2 in a post-combustion gas from a chemical looping combustion system for sequestration or reuse, the method comprising:
introducing a gas containing oxygen from an oxidizer of the chemical looping combustion system to an oxidizer of a post-combustion system;
introducing a post-combustion gas produced by the chemical looping combustion system into a reducer of the post-combustion system, the reducer being operatively connected to the oxidizer of the post-combustion system via a first separator and a second separator;
reacting the post-combustion gas in the reducer with a CLOU material and a solid oxygen carrier (SOC) material to oxidize impurities in the post-combustion gas;
transferring the post-combustion gas after it has been oxidized via the CLOU material to the first separator;
separating the CLOU material from CO2 contained in the post-combustion gas via the first separator;
transferring the CO2 to a CO2 capture system;
transferring the separated CLOU material to the oxidizer;
oxidizing the CLOU material via the oxidizer to produce a gas containing the oxidized CLOU material;
transferring the gas containing the oxidized CLOU material to the second separator;
separating the oxidized CLOU material from the gas via the second separator; and
transferring the oxidized CLOU material to the reducer; wherein:
the CLOU material releases gaseous oxygen within the reducer; and
the SOC material does not release gaseous oxygen within the reducer.

23. The method of claim 22 wherein the impurities are C, CO, CH4, or H2S.

24. The method of claim 22 wherein the CLOU material is manganese, copper or cobalt, or other such material exhibiting CLOU behavior.

25. The method of claim 22 wherein the CLOU material is a manganese oxide.

26. A system for oxidizing impurities in post-combustion gas comprising:
an oxidizer, the oxidizer receiving a gas containing oxygen from the oxidizer of a chemical looping combustion system;
a reducer operatively connected to the oxidizer, the reducer configured to receive the post-combustion gas;
a CLOU material and a solid oxygen carrier (SOC), each capable of selective circulation between the oxidizer and reducer;
wherein the CLOU material oxidizes impurities present in the post-combustion gas to remove the same; and
wherein the system further includes a controller configured to vary an amount of the CLOU material and the solid oxygen carrier (SOC) material circulated between the oxidizer and the reducer in dependence upon a real-time measurement of an amount of the impurities in the post-combustion gas.

* * * * *